Figure 1:
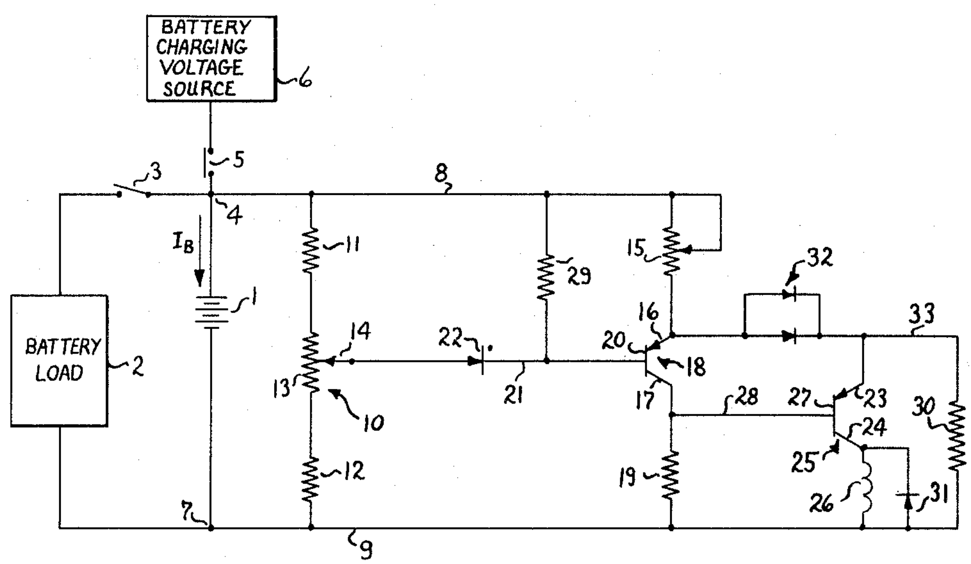

July 6, 1965 W. B. ZELINA 3,193,755

VOLTAGE REGULATOR

Filed May 25, 1962 2 Sheets-Sheet 1

INVENTOR.
WILLIAM B. ZELINA

BY Robert H Montgomery

Attorney

VOLTAGE REGULATOR

Filed May 25, 1962 2 Sheets-Sheet 2

INVENTOR.
WILLIAM B. ZELINA
BY Robert H Montgomery
HIS ATTORNEY

United States Patent Office 3,193,755

Patented July 6, 1965

3,193,755

VOLTAGE REGULATOR

William B. Zelina, Erie, Pa., assignor to General Electric Company, a corporation of New York Filed May 25, 1962, Ser. No. 200,015
3 Claims. (Cl. 322—28)

This application is a continuation-in-part of my copending application, Serial No. 157,964, now abandoned, filed December 8, 1961, and assigned to the same assignee as the present invention.

This invention relates to voltage regulators, and more particularly relates to voltage regulators of the type wherein the voltage of a volatge source or a generator is regulated within predetermined limits by operating a switching device to alternately connect and disconnect an electric circuit to a source of potential in response to sensing of predetermined voltage levels, so as to control the voltage across or current through the circuit.

An object of this invention is to provide a simple, improved, sharp-acting static switching circuit for initiating a switching function in response to sensing of predetermined voltage magnitudes. Another object of this invention is to provide such a circuit which senses any deviations in the voltage magnitude of a voltage beyond a predetermined range defined by maximum and minimum voltage levels. A further object of this invention is to provide such a circuit which has facility for easy selection of the voltage levels to be sensed which cause initiation of the switching functions. Another object of this invention is to provide a new and improved voltage regulator using transistors in the switching mode of operation. A still further object of this invention is to provide a new and improved constant potential OFF-ON type voltage regulator using semiconductor devices in the switching mode in which the frequency of switching is controlled.

Briefly stated, in accordance with one aspect of this invention, I have provided a new and improved voltage regulator system of the type wherein the voltage of a voltage source, such as a generator, is regulated within predetermined upper and lower limits by operating a transistor device to alternately connect and disconnect an electric circuit to a source of potential in response to sensing of predetermined voltage levels. The improvement comprises timing circuit means in combination with such a system for controlling the frequency of switching of the transistor device.

The invention may find application in many electrical systems where it is desired to initiate a switching function in response to occurrence of a predetermined voltage level or to sense changes in a voltage beyond predetermined maximum and minimum values and initiate a function in response thereto. The invention is particularly useful in sensing a voltage of a voltage source or generator whose voltage level may vary with some characteristic, where it is desired to maintain or regulate the voltage within given values, and the invention will therefore be disclosed in such environments.

Figure 2:
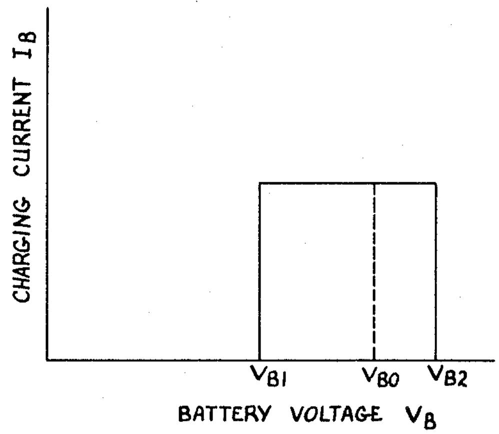
Figure 3:
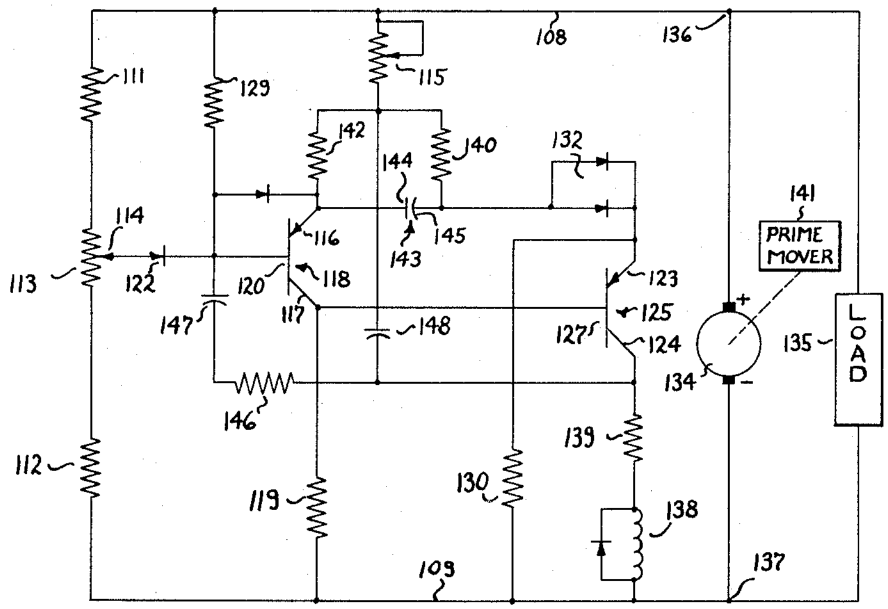
Figure 4:
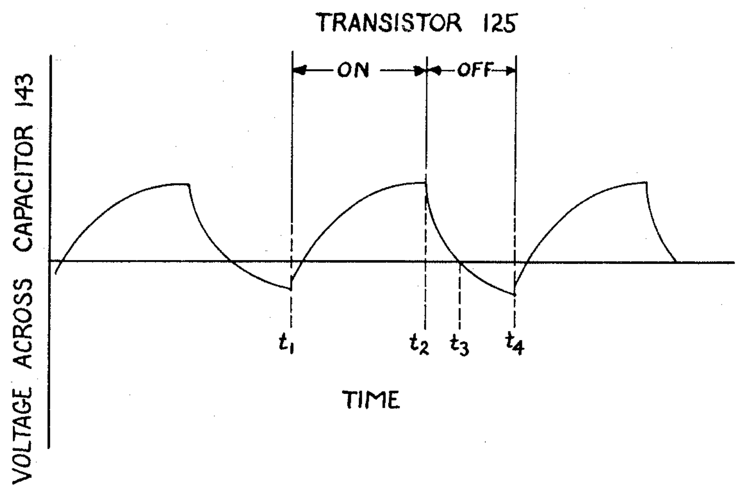

The features of the invention which are believed to be novel are set forth with particularity in the claims appended to and forming part of this application. However, the invention may be most easily understood by reference to the following description taken in conjunction with the drawings wherein:

FIG. 1 is a schematic diagram of a switching circuit embodying the invention;

FIG. 2 graphically aids in illustrating the operation of the circuit of FIG. 1;

FIG. 3 schematically illustrates a voltage regulator embodying the invention; and FIG. 4 is illustrative of a voltage wave form occurring in the circuit of FIG. 3 and aids in explaining the operation of the circuit of FIG. 3.

In FIG. 1, for purposes of illustration and disclosure, the voltage source whose voltage is to be sensed is shown as a battery 1 having an electrical load 2, represented in block, connected thereacross by means of a circuit-closing device such as a switch 3. The battery 1 will have a voltage determined by its state of charge and which decreases as the battery supplies energy to an electrical load.

In some applications, such as electrically propelled railway transit equipment, locomotives and passenger cars, batteries are used to supply electrical energy for lighting, heating, control equipment, etc. When such vehicles are not in immediate service, utilization of electrical power-consuming devices aboard the vehicle by cleaning and maintenance personnel consume the energy stored in the battery and the battery voltage drops as the battery is discharged. It is therefore customary to provide standby power facilities for battery charging, vehicle lighting, heating, etc. when the vehicle is out of service.

A specific structure of a circuit embodying the invention will first be described in FIG. 1, in which the positive terminal 4 of battery 1 is connected through a controlled switching device 5, more fully described hereinafter, to a battery-charging motor-generator set, an electrified third rail with suitable voltage-dropping facility, or any other source suitable for charging battery 1. The function of the circuit of FIG. 1 is to initiate switching functions to open switch 5 when battery voltage reaches a predetermined maximum value, and to close switch 5 when the voltage of battery 1 drops below a predetermined value.

Connected across positive terminal 4 and negative terminal 7 of battery 1 are conductor lines 8 and 9, and connected across lines 8 and 9 is a voltage divider 10 comprising resistances 11 and 12 and potentiometer resistance 13 having a variable tap 14 thereon. Also connected across lines 8 and 9 is a series circuit comprising a variable resistance 15, the emitter 16-collector 17 circuit of transistor 18 and resistance 19. The base 20 of transistor 18 is connected to potentiometer tap 14 through line 21 which contains a Zener diode 22 poled anode to potentiometer tap 14.

Across emitter 16 and line 9 is connected the emitter 23-collector 24 circuit of transistor 25 and relay coil 26. The relay coil 26 controls the operation of switch 5. The base 27 of transistor 25 is connected through line 28, the collector 17 of transistor 18, placing resistance 19 across base 27 and line 9.

The circuit of FIG. 1 further comprises resistances 29 and 30, diode 31 connected across coil 26 and diodes 32 in line 33 between emitter 16 and emitter 23, whose function is hereinafter described.

In accordance with the illustrated embodiment of the invention, the Zener diode is utilized as a battery voltage measuring device and in conjunction with the effective resistance value of variable resistance 15 and the setting of tap 14 determines when switch 5, which is controlled by relay coil 26, is opened and closed.

It will be seen that below some predetermined battery voltage there will be no reverse current flow through Zener diode 22 to tap 14, and when the voltage across Zener diode 22 is sufficient to cause breakdown of diode 22 and reverse flow therethrough, the emitter-collector circuit of transistor 18 will be triggered into conduction.

The voltage $V_Z$ across the Zener diode from cathode to anode may be expressed as $$V_z = V_{15} - V_B\left(\frac{R_{11}+R_{14}}{R_{11}+R_{12}+R_{13}}\right)$$

where $R_{11}$=resistance value of resistance 11

$R_{12}$=resistance value of resistance 12

$R_{13}$=resistance value of potentiometer 13

$R_{14}$=resistance value of resistance of potentiometer 13 between resistance 11 and tap 14

$V_B$=battery voltage $V_{15}$=voltage drop across the portion of resistance 15 effectively in the circuit It will be seen that when the cathode of Zener diode 22 sees a potential equal to battery voltage less $V_{15}$, assuming the emitter 16-base 20 voltage drop is negligible, while the anode is at a potential determined by battery voltage and the setting of tap 14. The Zener diode will conduct in the reverse direction only when the potential difference from cathode to anode exceeds the Zener or breakdown rating.

When battery voltage is such that Zener diode 22 breaks down, current flows in the emitter-base circuit of transistor 18 to tap 14, and transistor 18 is turned full ON and presents substantially no impedance to current flow therethrough. The potential at emitter 16 is essentially the same as the voltage drop across resistance 19, which is also the potential at base 27 of transistor 25 in view of the connection therebetween by line 28. However, the potential at emitter 23 of transmitter 25 is less than the potential at base 27 by virtue of the small voltage drop across diodes 32 which are placed in line 33 to back bias emitter 23.

It is therefore seen that when the battery voltage rises, due to charging thereof by source 6, to a level which causes Zener diode 22 to break down and conduct in the reverse direction, transistor 25 is immediately turned off and relay coil 26 is de-energized, which causes switch 5 to drop out and disconnect battery 1 from source 6.

It will thus be apparent that when the battery voltage reaches a predetermined maximum magnitude, this voltage magnitude is sensed and a switching function is initiated.

When transistor 25 is turned OFF, the current through the effective resistance of variable resistance 15 decreases because the other current paths from line 8 through resistance 15, through resistance 30 and through transistor 18 and resistance 19, offer substantially more resistance to current flow. This results in a lesser voltage drop $V_{15}$ across the effective resistance of resistance 15. The Zener diode will continue to conduct until battery voltage falls to a value which causes voltage $V_Z$ across Zener diode from base 20 to tap 14 to be below the breakdown voltage $V_{ZB}$ of Zener diode 22.

Assuming battery voltage decreases, due to loading of the battery, when $V_Z$ decreases below $V_{ZB}$, Zener diode 22 no longer conducts in the reverse direction, base 20 of transistor 18 assumes the potential of tap 14 (neglecting forward voltage drop across diode 22), and transistor 18 is triggered OFF. When transistor 18 is turned OFF, the potential at the emitter 23 of transistor 25 becomes much more positive than the potential at the base 27 thereof, and transistor 25 switches ON causing relay 26 to be energized, which closes switch 5.

In this manner, the illustrated circuit senses when the battery voltage reaches a minimum predetermined voltage and initiates a switching function in response thereto which places the battery on charge, and as previously explained, the circuit also senses a predetermined maximum voltage and initiates a switching function in response thereto to take the battery off of charge.

In the particular circuit illustrated, the resistance 29 is placed in the circuit to provide a bias and minimize possible adverse effects on the transistor due to its temperature sensitivity. As temperature increases, the static resistance between the base and collector of transistor 18 tends to decrease which will cause a small emitter-collector turn-ON current to flow. Resistance 29 nullifies this tendency by providing a reverse current bias on the base-to-collector circuit of transistor 18.

The value of resistance 19 is selected in accordance with the expected gain variation of transistor 25 to insure that sufficient base current flows from base 27 to ensure positive turn-ON of transistor 25 when transistor 18 is triggered OFF.

Resistance 30 is connected across lines 33 and 9 to ensure that a minimum current will flow through diodes 32 at all times and cause a small voltage drop thereacross to provide a predetermined reverse bias on emitter 23.

Diode 31 is provided across coil 26 to commutate transient currents generated by the relay coil 26 upon switching of current therethrough.

Thus far, to disclose the invention, a specific circuit and its operation has been described in detail without reference to the functions which the various elements and subcircuits provide. These functions are now summarized in view of the foregoing detailed description.

The voltage divider network 10 senses the voltage of battery 1 and a portion of this voltage is detected between line 8 and tap 14. The loop circuit from tap 14 to line 8 through resistance 15, emitter 16-base 20 and diode 22 comprises a voltage-measuring circuit which is responsive to predetermined upper and lower voltage magnitudes defining a voltage range. Transistor 18 is a triggering device which is triggered OFF and ON depending on the voltage measured by the aforementioned loop circuit. Transistor 25, which is of the type designated as a power transistor because of its relatively large current-conducting capacity, is operated as an OFF-ON switch by the triggering transistor 18 in response to deviations of a voltage beyond the defined voltage range.

The operation of the circuit may be better appreciated by reference to FIG. 2, which is a plot of battery voltage $V_B$ versus charging current $I_B$ from charging source 6. Assume that the nominal battery voltage is $V_{B0}$ and the battery voltage is to be regulated or maintained within lower limit $V_{B1}$ and upper limit $V_{B2}$. When battery voltage $V_{B2}$ falls to voltage $V_{B1}$ the voltage $V_Z$ will fall below the Zener breakdown voltage $V_{BZ}$ and diode 22 will sharply cease to conduct. At this point the voltage-measuring loop, previously traced, will act as a rapidly opening switch due to the resulting increase in voltage that occurs across the effective resistance of resistance 15 due to increase in current therethrough to the emitter-collector circuit of transistor 25. This increase in voltage across the effective resistance of resistance 15 provides regenerative action to insure sharp turn-ON of transistor 25. In a similar manner, regenerative action occurs in reverse when the battery voltage increases in magnitude to $V_{B2}$ to ensure sharp turn-OFF of transistor 25. When diode 22 ceases to conduct in the reverse direction, a forward bias occurs on transistor 25, as previously explained, which immediately switches ON and causes relay 26 to close switch 5 and commence charge of battery 1. When battery 1 has charged to voltage $V_{B2}$ and the voltage $V_Z$ across diode 22 reaches or slightly exceeds the Zener voltage $V_{B2}$, transistor 18 is triggered ON, which immediately switches transistor 25 OFF, resulting in relay 26 being de-energized and switch 5 opening.

In FIG. 2, the charging current $I_B$ is shown to have a constant value; however, the charging current will depend on the charging source.

An important aspect of the invention is the facility with which both the voltage magnitudes to be sensed and the range therebetween are selected. It will be seen from the equation for $V_Z$ previously set forth that the equation is dependent on the setting of tap 14 and the effective resistance value of variable resistance 15.

It may be seen from the aforementioned equation that the setting of tap 14 primarily determines the battery voltage $V_{BZ}$ which will produce a Zener voltage $V_{B2}$ to trigger transistor 25 ON. The effective resistance value of variable resistance 15 determines the range between $V_{B2}$ and $V_{B1}$ and hence the voltage level $V_{B1}$.

The invention may also be utilized in constant voltage regulators, as, for example, with generators, in which the regulator controls energization of the generator field, to regulate the voltage output of the generator by intermittently connecting and disconnecting the generator field to a voltage source. A common name for regulators of this type is "bang-bang" regulators. As the name implies, the control "bangs" full ON and then "bangs" full OFF. It does this rapidly enough so that the generator output varies only a small amount between ON and OFF states of the regulator. Using this form of control, the power handling switching devices betwen the potential source and the generator field devices act like relay contacts and are not required to dissipate much power. When ON, the current flow therethrough produces but negligible voltage drop, and when OFF, there is no current flow therethrough.

Inasmuch as semiconductor devices are very susceptible to heat, the frequency of switching should be low enough so that there is no overheating of the transistor; however, when used in the switching mode to control the time of energization of an inductive load, the frequency of switching should be high enough so that there is no appreciable change in generator output voltage due to inductive time constants of the load.

Reference is now made to FIG. 3, which illustrates an embodiment of the invention in a generator voltage regulator. In the circuit diagram of FIG. 3, equivalent elements to those of FIG. 1 bear the same identifying numeral advanced by one hundred.

In FIG. 3, a dynamoelectric machine illustrated as a direct current generator 134 supplies electrical energy to a load device 135 connected across terminals 136 and 137. The generator 134 has a shunt field 138 in series with a current-limiting resistance 139, transistor 125, diodes 132, resistance 140 and resistance 115. The series circuit just described is connected between lines 108 and 109, which are connected to terminals 136 and 137 respectively across the output of generator 134. It may be seen that the circuit of FIG. 3 is quite similar to that of FIG. 2 and operates in a similar manner in that the voltage output of generator 134 is sensed between line 108 and tap 114 of potentiometer 113 across Zener diode 122 and the base 120-emitter 116 circuit of transistor 118, and transistor 125 will be switched ON or OFF in response to predetermined upper and lower values of the voltage appearing across terminals 136 and 137.

The generator 134 is driven by a prime mover 141, which may be a motor or an internal combustion engine, and the generator 134 may operate at variable speed and the regulator circuit of FIG. 3 operates to control energization of shunt field 138 to regulate the voltage output of generator 134 within close predetermined limits, even though generator speed and load may vary.

In accordance with the invention as illustrated in FIG. 3, means are provided to control the frequency of switching of transistor 125 and thereby control the ratio of ON to OFF time of transistor 125, and hence the time of energization of generator field 138. The frequency controlling means comprises resistance 140, resistance 142 and capacitor 143. With this arrangement, it will be noted that the potential at the emitter 116 of transistor 118 must follow the potential at plate 144 of capacitor 143, and transistor 118 will turn ON only when the voltage across capacitor 143 has reached a predetermined value.

Assume now that transistor 125 is switched ON and its current is flowing through generator field 138 and the load 135 on generator 134 is constant. The voltage of generator 134 will be increasing. Therefore, the voltage between line 108 and tap 114 across resistances 115, 142, emitter 116-base 120 and Zener diode 122 is increasing. However, the potential at emitter 116 must follow the potential at plate 144 of capacitor 143, and Zener diode 122 will not break down and conduct from base 120 to tap 114 until plate 114 has charged to a potential with respect to tap 114 which exceeds the voltage required to break down Zener diode 122 (neglecting emitter 116-base 120 voltage drop). Reference is now made to FIG. 4, which is illustrative of the voltage wave form across capacitor 143 from plate 144 to 145 when the load on generator 134 does not vary. Assume that at time $t_1$ power transistor 125 starts to conduct. Then, commencing at time $t_1$, plate 144 of capacitor 143 will be charged with current flowing from line 108 through resistances 115 and 142 and the voltage will build up across capacitor 143, as illustrated in FIG. 4. As the potential at plate 144 reaches a value sufficient to break down Zener diode 122, time $t_2$, transistor 118 will conduct collector current and the voltage across resistance 119 will suddenly increase, increasing the potential at base 127 of transistor 125 and switch transistor 125 OFF. When transistor 125 is switched OFF, current will commence to flow into plate 145 of capacitor 143 through resistances 115 and 140, and at the same time the charge on capacitor 143 will leak off through the emitter-collector circuit and emitter-base circuit of transistor 118 and the voltage across capacitor 143 will decrease until time $t_3$, at which time it will reverse with plate 145 becoming positive with respect to plate 144.

Inasmuch as transistor 125 is not conducting, and therefore generator field 138 is not connected to line 108, the terminal voltage of generator 134 will commence to decrease until such time as the voltage from line 108 across Zener diode 122 is insufficient to hold Zener diode 122 in a reversely conductive condition. At this point, which corresponds to time $t_4$ of FIG. 4, transistor 118 will switch OFF, decreasing the voltage drop across resistance 119, and thereby decreasing the potential at base 127 switching transistor 125 ON. At this time, plate 144 of capacitor 143 will be charged by current flowing through resistances 115 and 142, as exemplified by FIG. 4 between $t_1$ and $t_2$ to repeat the aforementioned cycle. Therefore, the ON time of transistor 125 will be determined by the time constant of the product of resistance 142, capacitor 143, and resistance 115. The OFF time of transistor 125 will then primarily be a function of the magnitude of the load on generator 134. The regulator of FIG. 3 will maintain the output voltage of generator 134 within close predetermined limits even though the speed of generator 134 may vary as well as the load thereon.

With this arrangement just described, the frequency of switching of transistor 125 may be selected to be compatible with the inductive time constants of generator field 138, and the frequency of switching should be sufficiently high that there will be no large change between maximum and minimum field current. The frequency of switching, however, should be chosen sufficiently low that overheating of the transistors does not occur.

It may be seen from FIG. 4 that the ON time of transistor 125 will be greater than the OFF time, as exemplified by comparison of the time interval $t_1$–$t_2$ and with time interval $t_2$–$t_4$. The time intervals may, as previously stated, have ratios determined by the loading of generator 134, and also by the selection of the values of resistances 140, 142 and capacitor 143. In most applications of the type illustrated in FIG. 3, resistance 142 will be much larger than resistance 140 and both resistances 142 and 140 will be much larger than resistance 115.

For purposes of illustration only, the circuit of FIG. 3 utilized to regulate the output voltage of a generator having a rated output voltage of 37.5 volts, and a field range of 0.8 to 2.5 amperes to within plus or minus one volt, had the following component values:

| | | |
|---|---|---|
| Resistance **111** | ohms | 50 |
| Resistance **112** | do | 200 |
| Resistance **115** | do | 0.1 |
| Resistance **119** | do | 350 |

| | | |
|---|---|---|
| Resistance 129 | ohms | 1000 |
| Resistance 130 | do | 8000 |
| Resistance 138 | do | 3 |
| Resistance 140 | do | 1 |
| Resistance 142 | do | 6 |
| Resistance 146 | do | 1000 |
| Capacitance 143 | microfarads | 100 |
| Capacitance 147 | do | 0.10 |
| Capacitance 148 | do | 0.47 |

Further in accordance with the invention, means are provided to decrease the time of change of the transistors from one stable state to the other, i.e., when switching from ON to OFF, or vice versa. To decrease switching time, and therefore decrease the possibility of overheating the transistors, a resistance-capacitance feedback network comprising resistance 146 and capacitor 147 is provided between the collector 124 of transistor 125 and base 120 of transistor 118. This series resistance-capacitance network will feed back a transient signal when switching of transistor 125 commences, which hastens change of state of the transistors 118 and 125. As transistor 125 commences to switch OFF, the voltage across resistance 139 and generator field 138 suddenly starts to decrease, and this negative going transient voltage is applied to base 120 through capacitor 147 and resistance 146 to accelerate turn-ON of transistor 118, and hence turn-OFF of transistor 125. The operation is the reverse of that just described when transistor 125 starts to switch ON. This feedback circuit decreases the time of switching and further eliminates any tendency for transistor 125 to switch or partially switch several times in going from one stable state to the other.

A capacitor 148 may be provided to eliminate any voltage spikes which might tend to appear across transistor 125 when transistor 125 is OFF. It will be seen that the capacitor 148 will effectively shunt any transients around transistor 125.

While preferred embodiments of the invention useful in particular applications have been selected for purposes of disclosure, other embodiments and modifications of the invention may occur to those skilled in the art which do not depart from the spirit and scope of the invention. Accordingly, it is intended in the appended claims to cover all modifications and changes of the invention chosen for purpose of disclosure which do not depart from the spirit and scope of the invention.

What is claimed as new and is desired to secure by Letters Patent of the United States is:

1. In a voltage regulating system of the type wherein a first transistor device having an emitter, a base, and a collector electrode, is switched between conductive and nonconductive states in response to the operating condition of a voltage reference device to switch a second transistor device having an emitter, a base and a collector electrode, between nonconductive and conductive states for controlling the field excitation of a generator to regulate the output voltage thereof within predetermined upper and lower limits, the combination with said system of a resistance-capacitance timing network interconnecting the emitter electrodes of said first and second transistor devices and being operative to maintain said first transistor device in its nonconductive state until the capacitance has charged to a predetermined level and controlling the conducting time of said second transistor device.

2. The voltage regulating system of claim 1 wherein said voltage reference device is a Zener diode and said second transistor device is a power transistor connected in series with the field winding of said generator.

3. In a voltage regulating system of the type wherein a first transistor device is switched between conductive and nonconductive states in response to the operating condition of a voltage reference device to switch a second transistor device between nonconductive and conductive states for controlling the field excitation of a generator to regulate the output voltage thereof within predetermined upper and lower limits, the combination with said system of a resistance-capacitance timing circuit interconnecting said first and second transistor devices, said timing circuit being operative to maintain said first transistor device in its nonconducting state until said capacitance has charged to a predetermined level and control the conducting time of said second transistor device.

References Cited by the Examiner

UNITED STATES PATENTS

| | | |
|---|---|---|
| 2,890,404 | 6/59 | Cronin. |
| 2,945,174 | 7/60 | Hetzler. |
| 3,025,449 | 3/62 | Luscher. |

LLOYD McCOLLUM, *Primary Examiner.*